(12) United States Patent
Meissner et al.

(10) Patent No.: US 7,032,027 B1
(45) Date of Patent: Apr. 18, 2006

(54) METHOD OF PROCESSING NESTED MESSAGE LAYERS

(75) Inventors: Walter Hans Meissner, Morristown, NJ (US); Gines Milara, Warren, NJ (US); Ramakrishna Vishnuvajjala, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 547 days.

(21) Appl. No.: 09/689,647

(22) Filed: Oct. 13, 2000

(51) Int. Cl.
*G06F 15/16* (2006.01)
(52) U.S. Cl. .................................. 709/230; 709/250
(58) Field of Classification Search ............. 709/227, 709/228, 250, 331, 230; 717/151, 157
See application file for complete search history.

(56) References Cited

U.S. PATENT DOCUMENTS

| 5,548,723 | A | * | 8/1996 | Pettus | 709/228 |
| 5,734,865 | A | * | 3/1998 | Yu | 709/250 |
| 5,903,754 | A | | 5/1999 | Pearson | 395/680 |
| 6,006,294 | A | * | 12/1999 | Kurihara | 710/52 |
| 6,081,524 | A | * | 6/2000 | Chase et al. | 370/389 |
| 6,434,620 | B1 | * | 8/2002 | Boucher et al. | 709/230 |
| 6,457,066 | B1 | * | 9/2002 | Mein et al. | 709/330 |
| 6,578,084 | B1 | * | 6/2003 | Moberg et al. | 709/236 |
| 6,697,871 | B1 | * | 2/2004 | Hansen | 709/234 |

FOREIGN PATENT DOCUMENTS

| EP | 0572865 | 12/1993 | |
| WO | WO 0020993 | 4/2000 | 370/230 |

OTHER PUBLICATIONS

Huang et al., "A Refined Cut-Through Buffer Management Scheme for Layered Protocol Stacks," Mar. 1994, IEEE Communications Magazine, pp. 82-85.*
Tantiprasut et al., "ASN.1 Protocol Specification for Use With Arbitrary Encoding Schemes," Aug. 1997, IEEE/ACM Transaction on Networking, vol. 5, Iss. 4, pp. 502-513.*
Halsall, Fred, "Data Communications, Computer Networks and Open Systems", GB, Harlow, Addison-Wesley, 1996, pp. 828-863, 4$^{th}$ Ed.1998.

* cited by examiner

*Primary Examiner*—Bunjob Jaroenchonwanit
*Assistant Examiner*—Sean Reilly

(57) ABSTRACT

A method of processing nested message layers which allows for encoding all the message layers into one formatted message buffer without incurring a copy at each message layer. A generalized approach for representing the context of each message layer and linking them to facilitate the encoding and decoding of message layers.

14 Claims, 8 Drawing Sheets

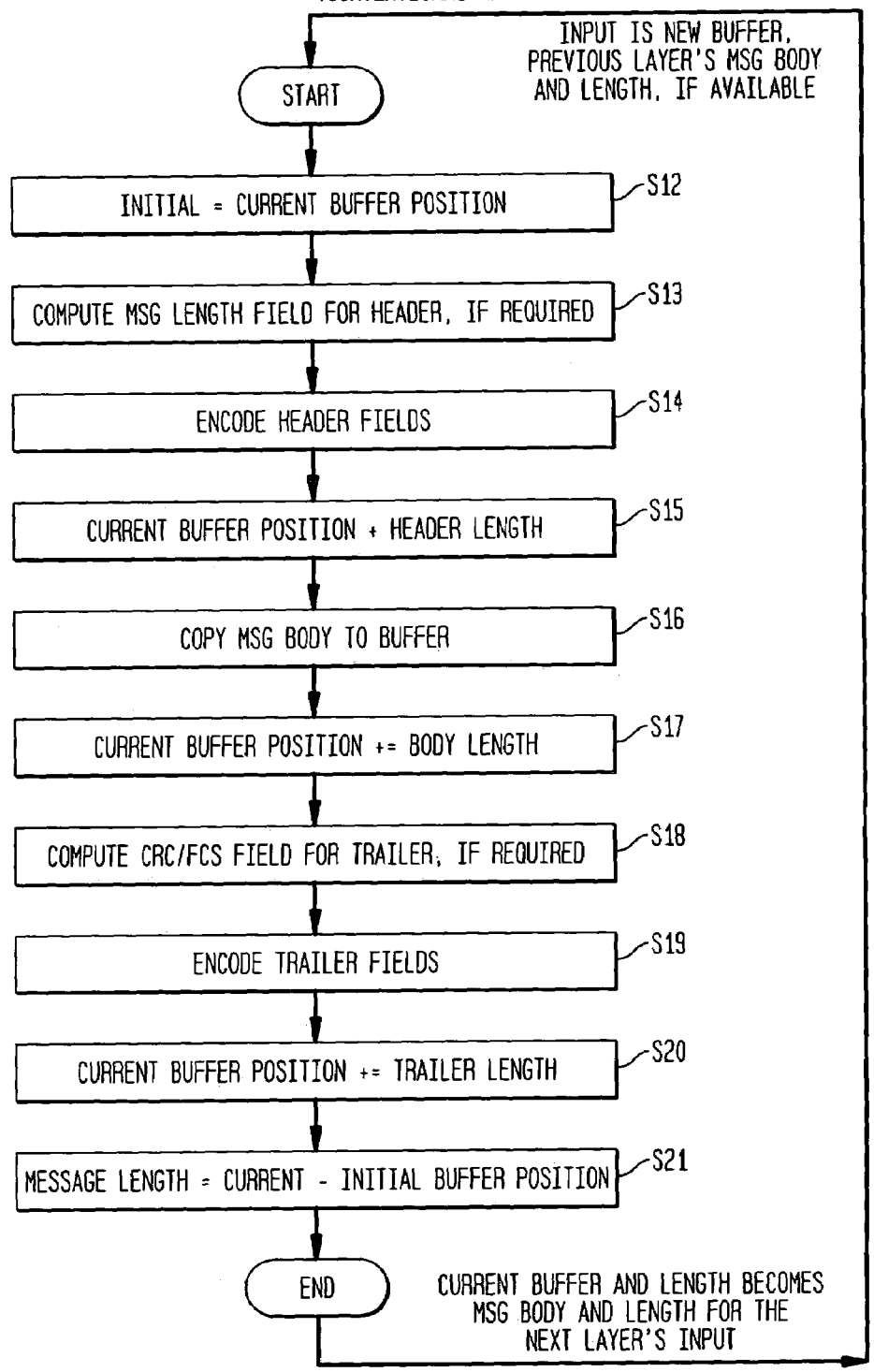

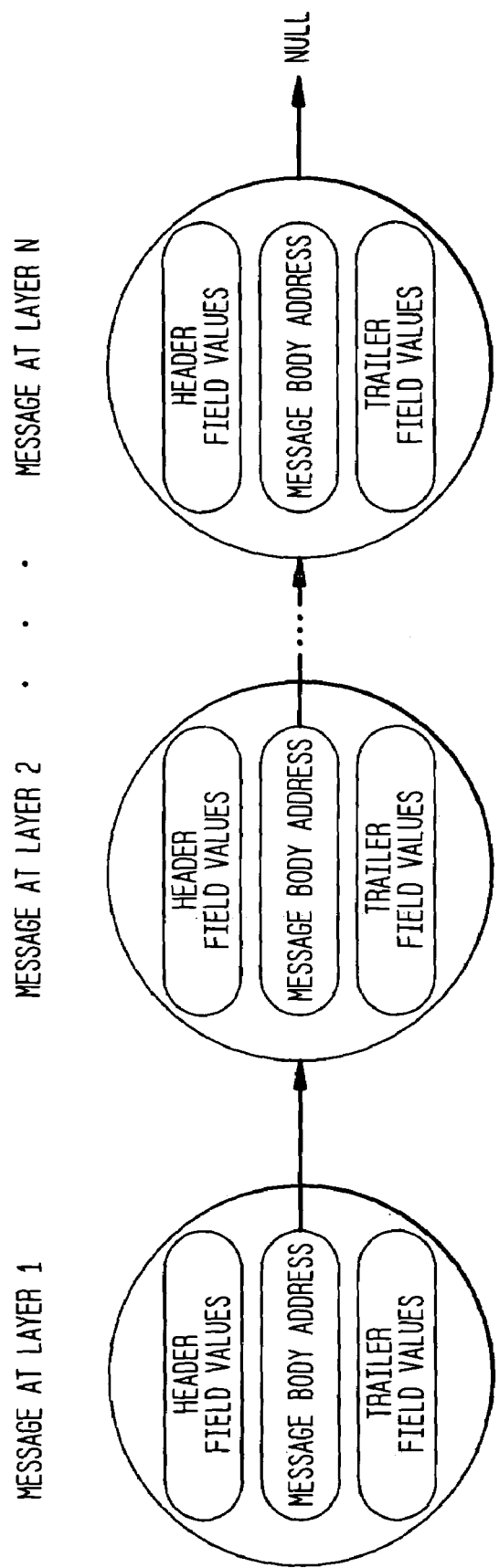

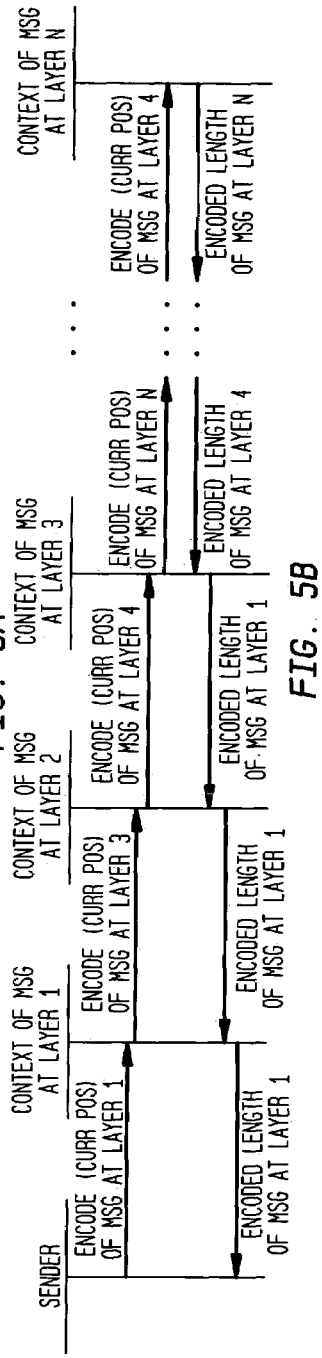
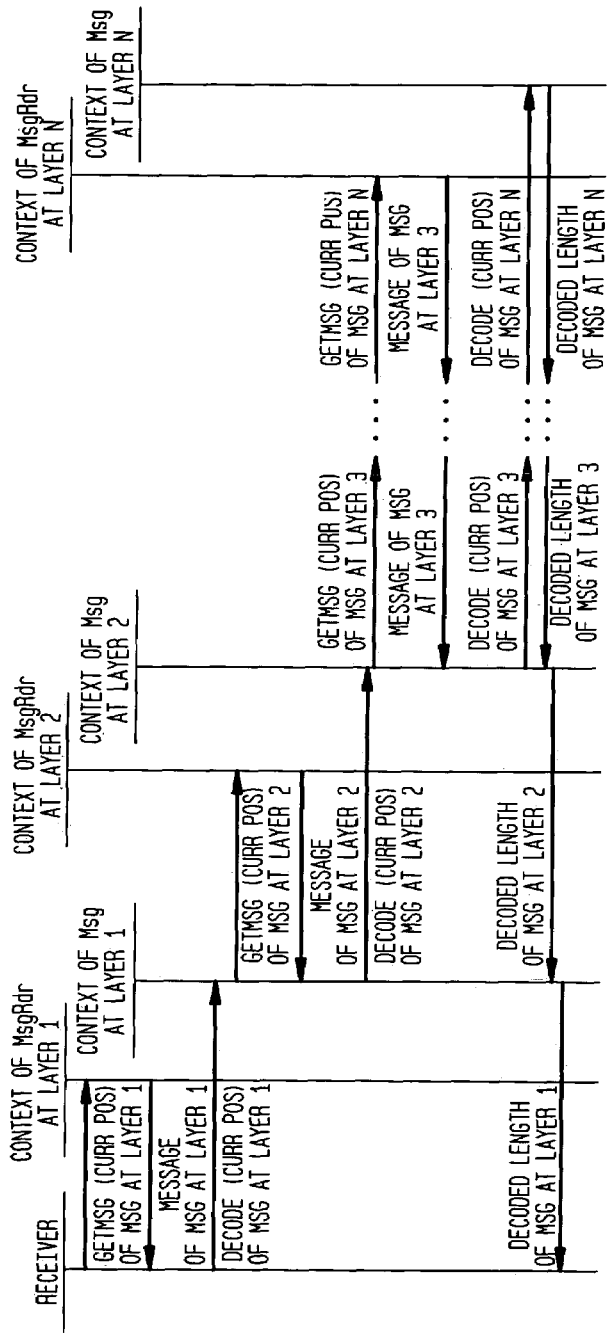
FIG. 5A
FIG. 5B

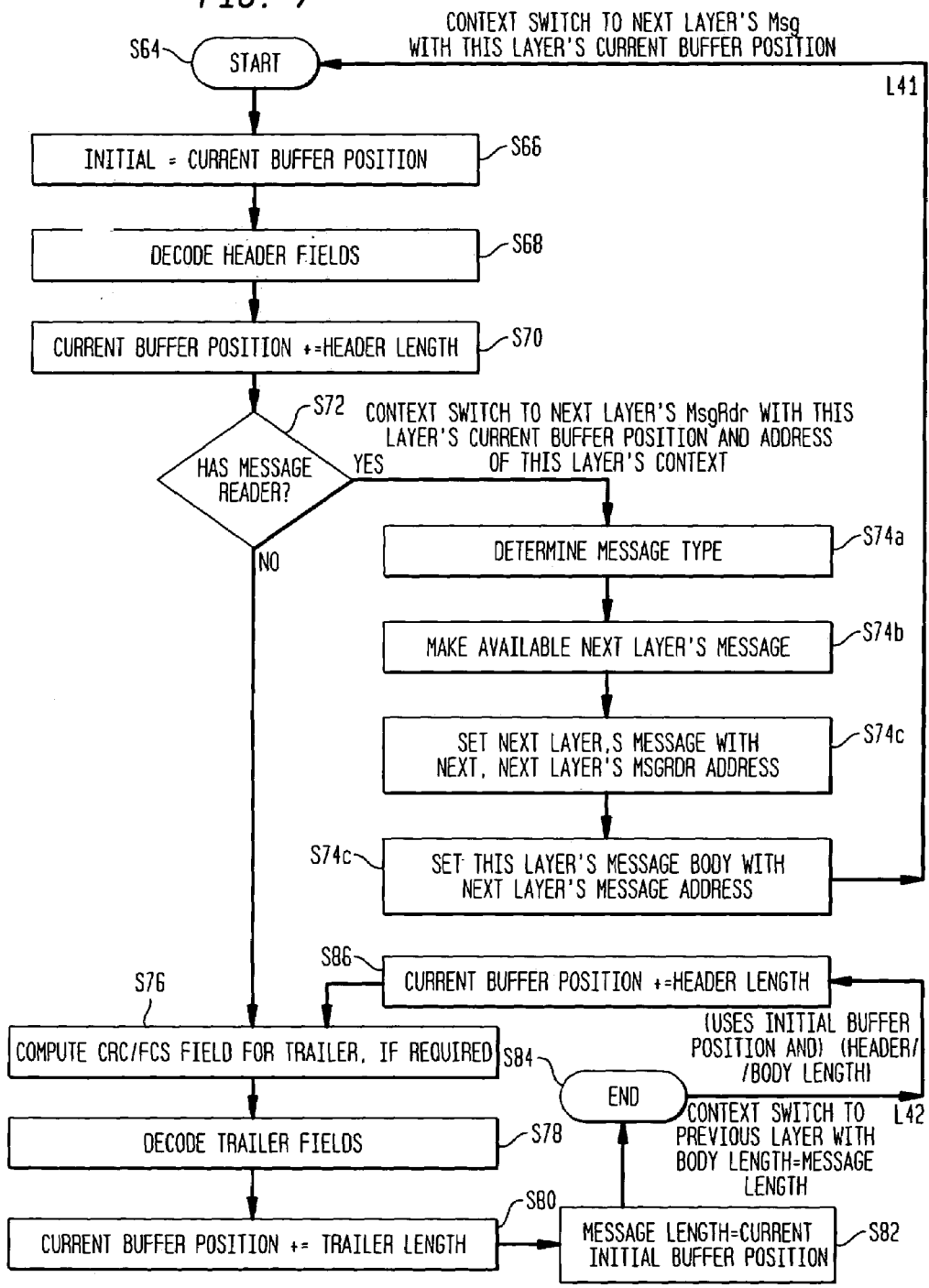

METHOD OF PROCESSING NESTED MESSAGE LAYERS

BACKGROUND OF THE INVENTION

1. Field of the Invention

This invention relates to a method of processing nested layers in multi-layered messages.

2. Description of Related Art

Many different conventional communication networks are in existence today, including optical, RF, broadband and narrow-band networks in either a cabled or a cable-less configuration. A typical communication network has an architecture based upon layers arranged in a protocol stack. Each layer corresponds to a service performed within the communication network. Each layer offers a service to the next higher layer, while shielding that layer from the implementation details of its own layer. Each layer also accesses a service offered by its immediate lower layer without bypassing any other layers.

One such conventional model for a layered communication network architecture is the Open Systems Interconnection (OSI) model, which delineates the services of a communication network into seven layers. FIG. 1a is a symbolic representation of the OSI model. The layers in the OSI model are, in ascending order, layer 1: the physical layer, layer 2: the data link layer, layer 3: the network layer, layer 4: the transport layer, layer 5: the session layer, layer 6: the presentation layer, and layer 7: the application layer. Each layer implements one or more protocols for the service at that layer. Layer 1, the physical layer, is concerned with the unstructured bit stream over a physical medium. Layer 2, the data link layer, provides for reliable transfer of information across the physical link using synchronization, flow control and error control as necessary. Layer 3, the network layer, provides independence from data transmission and switching technologies and is responsible for establishing, maintaining, and terminating connections. Layer 4, the transport layer, provides reliable transparent transfer of data between end points with end-to-end error recovery and flow control as needed. Layer 5, the session layer, establishes, manages and terminates connections (sessions) between cooperating applications. Layer 6, the presentation layer, provides independence to the application from differences in data presentation such as the format of the data and/or data encryption (scrambling/descrambling). Layer 7, the application layer, provides access to the OSI environment for the application running on behalf of the user. Examples of such applications are file transfer, terminal emulation, electronic mail, wireless telephony, etc. The application layer is often referred to as the "user" level. Data transmitted at the user level may be user text, binary data, voice data and/or image data, etc.

Other data communication network architectures follow the general principles of the OSI model. The general principles are pertinent to this invention and not the exact number of layers or the exact service provided by each layer.

Data communication messages transmitted through the layers of a communication network are arranged as nested messages. The term "nested" is used to describe a network architecture in which a message of one layer is nested within a message of an adjacent lower layer. FIG. 1b illustrates messages at generic layers i, j and k. While a different message exists at each layer of the communication network, the messages are actually different versions of a single message as it progresses through the communications network. A message, when it is, for example, at layer k, may be referred to as "the message at layer k" or "layer k message".

As the message progresses "downward" through the protocol stack, each layer encapsulates the message body of the next higher layer with its own header and, optionally, trailer information. Therefore, the layer j message consists of the layer k message encapsulated with layer j header and, optionally, j trailer information. Similarly, the layer i message consists of the layer j message encapsulated within layer i header and, optionally, i trailer information. The header has a length field (len) containing the length (in octets or bits) of the encapsulated information following the header. The length field is used to determine where the trailer begins. The trailer may require a cyclic redundancy check (CRC) calculation to generate a frame check sequence (FCS) field. The FCS field is used to conform to a bit error rate with acceptable levels by detecting bit errors, and ordering the layer containing the particular trailer to request re-transmission of a message when a bit error occurs. For illustrative purposes, the layer k in FIG. 1b corresponds to the user layer.

In the OSI model, as messages are passed between layers, a copy of a formatted buffer is passed from layer to layer. In addition, every message must proceed through every layer of the protocol stack. At each layer of the OSI model, a message buffer exists which contains an instance of the message at that layer.

FIG. 2 illustrates a conventional method for processing layer 1 through n messages between layers in a conventional communication network; In FIG. 2, encoding of a higher level layer j+1 message and nesting of a higher level layer j+1 message within a next lower level layer j message is illustrated. Encoding of a message at a layer moves message field values in the message to octets or bits of a formatted message stream. After all of the messages at each layer in a protocol stack are processed, the resultant message stream is the octet or bit buffer that holds all of the formatted layers, the formatted messages being ready for transmission over the physical layer of the communication network.

In FIG. 2, the input to processing the message at an initial layer is a new or free buffer, and the initial message body information and its length. The initial message body may be user data. The process begins with the upper most layer n. In step S12, the initial buffer position is set as equal to the value of the current buffer position. The length field for the header for the layer n message is computed from the header length and the body length in step S13. In step S14, the header is encoded into the message stream, and the current buffer position is incremented by the header length in step S15. In step S16, the message body for the message at layer n is copied into the current buffer position, and the current buffer position is incremented by the message body length in step S17. A cyclic redundancy check (CRC) field is computed in step S18. In step S19, the trailer is encoded into the message stream and the current buffer is incremented by the trailer length in step S20. The message length for the layer n message is calculated in step S21. The method then returns to Start, and the initial buffer position and the current formatted length becomes the message body and length for layer n−1 message. When all layers have been processed in this manner, the resultant buffer is the sum of the all the layers formatted into a message stream buffer and ready for transmission on the physical layer.

Each layer does not know about the other layer's headers and trailers or their sizes. The conventional method consists of passing the address of each layer's formatted message buffer to the next layer. Therefore, in the conventional method, a separate buffer must be used to process each layer. This incurs a buffer copy of a formatted message at each layer and consumes extra processing time. Also, the higher layer's processing must be completed before the message length and CRC fields can be determined in the currently processed layer.

SUMMARY OF THE INVENTION

The present invention uses unformatted values between layers of a layered model. For example, according to an embodiment of the present invention, the address of the context of the message layer with its unformatted values and its methods, encoding and decoding, that are employed are passed to the adjacent layer. Each layer does this in turn until all the contexts of each layer are linked in sequence according to the layers processed. The order of the linking is from the outer (lowest) layer to the inner (highest) layer. When all the layers' contexts are linked, the encoding is done into one formatted buffer.

The embodiment of the invention also describes the decoding process. The decoding process will decompose the formatted message buffer back into each layer's context. The present invention will work with headers of variable length, having a message length field and trailers having CRC/FCS fields.

Further scope of applicability of the present invention will become apparent from the detailed description provided hereinafter. It should be understood, however, that the detailed description and specific examples, while disclosing the preferred embodiments of the invention, are provided by way of illustration only, since various changes and modifications coming within the spirit and scope of the invention will become apparent to those skilled in the art from the following detailed description.

BRIEF DESCRIPTION OF THE DRAWINGS

The present invention will become more fully understood from the detailed description found herein below and the accompanying drawings which are provided by way of illustration only, and thus are not meant to limit the present invention, and wherein:

FIG. 2 illustrates a conventional method for processing layered messages;

FIG. 3 illustrates an arrangement of message layers according to an embodiment of the present invention;

FIG. 5a illustrates encoding sequence of message layers according to an embodiment of the present invention;

FIG. 5b illustrates decoding sequence of message layers according to an embodiment of the present invention;

FIG. 7 illustrates decoding method of message layers according to an embodiment of the present invention;

DETAILED DESCRIPTION OF THE PREFERRED EMBODIMENTS

For the purposes of describing embodiments of the present invention, the term "processing" of a message layer indicates the general operations of encoding, decoding, copying into and out of a buffer, advancing the buffer, etc.

FIG. 3 illustrates a simplified model for layer 1, 2, . . . , N messages according to an embodiment of the present invention. Each layer is represented by a "context." The context is at the address at which the values and methods for that layer are stored and will be discussed in further detail hereinafter. Each layer 1, 2, . . . , N message contains header field values and trailer field values. The header field values and trailer field values represent the data fields within each layer 1, 2, . . . , N message. Each layer 1, 2, . . . , N message includes the message body addresses, or, "pointers," 1, 2, . . . , m, that "point" to the context of the next higher layer. When processing message layers to do encoding, each layer, starting with layer N, sets the appropriate field values (except for message body dependent fields such as message length and a CRC value) and passes the address of its context to the next lower layer. The next lower layer will set the message body address to that value. This proceeds until the lowest layer 1 is reached. This links all message layers contexts together, as shown in FIG. 3. All the message layers are thereafter ready for encoding.

Figure 1A:
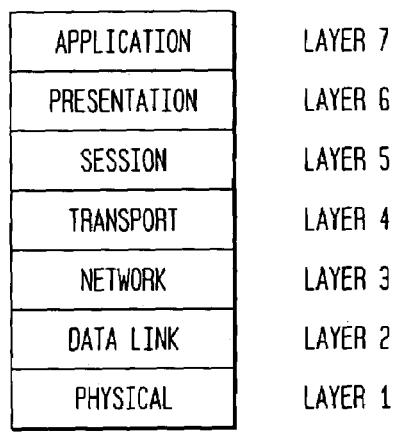
FIG. 1a illustrates the OSI model.
Figure 1B:
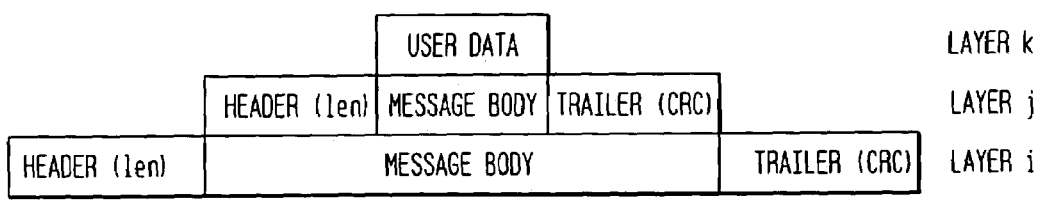
FIG. 1b illustrates a conventional multi-layered protocol stack.
Figure 4A:
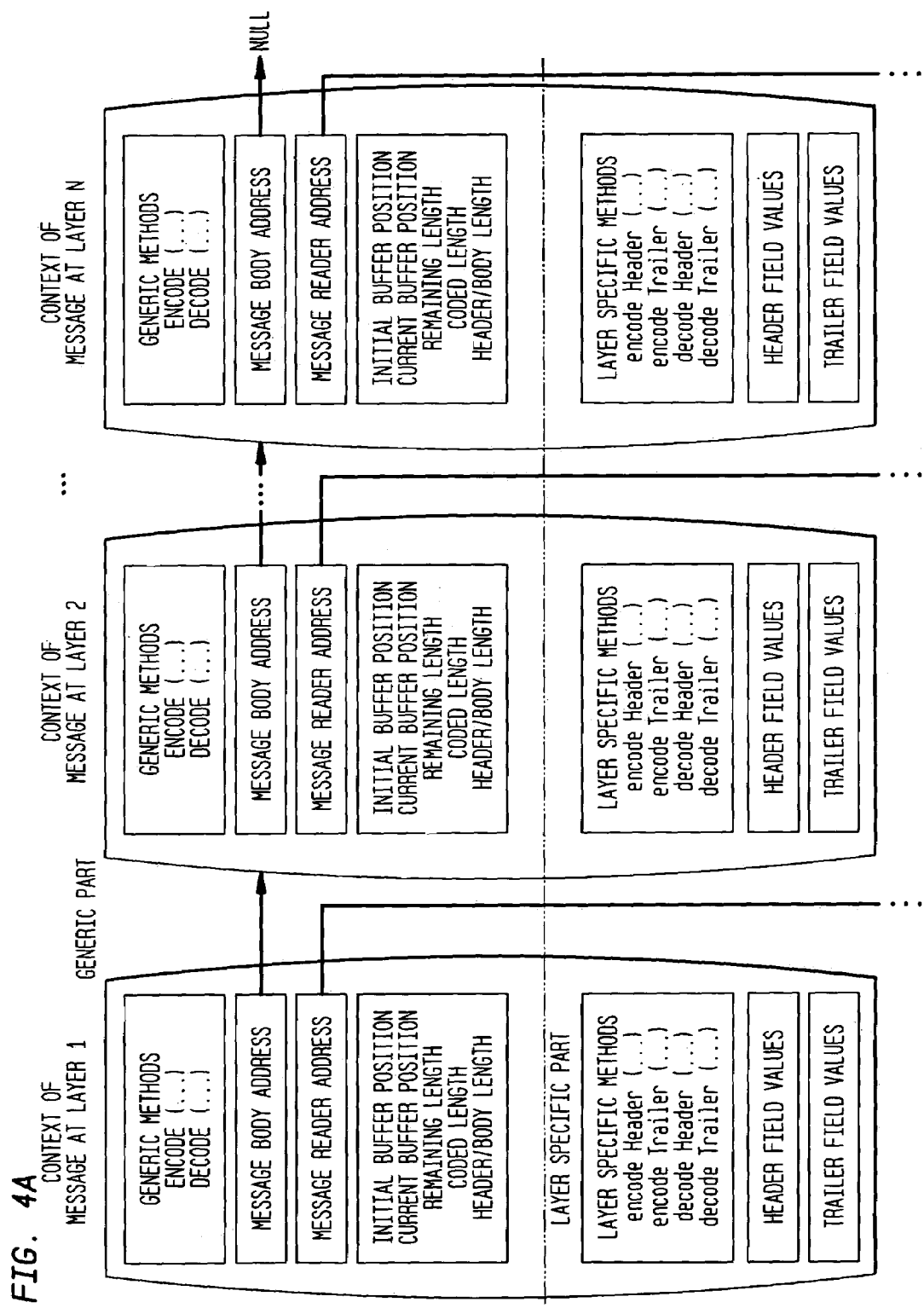
FIG. 4 illustrates message and message reader contexts according to an embodiment of the present invention.
Figure 4B:
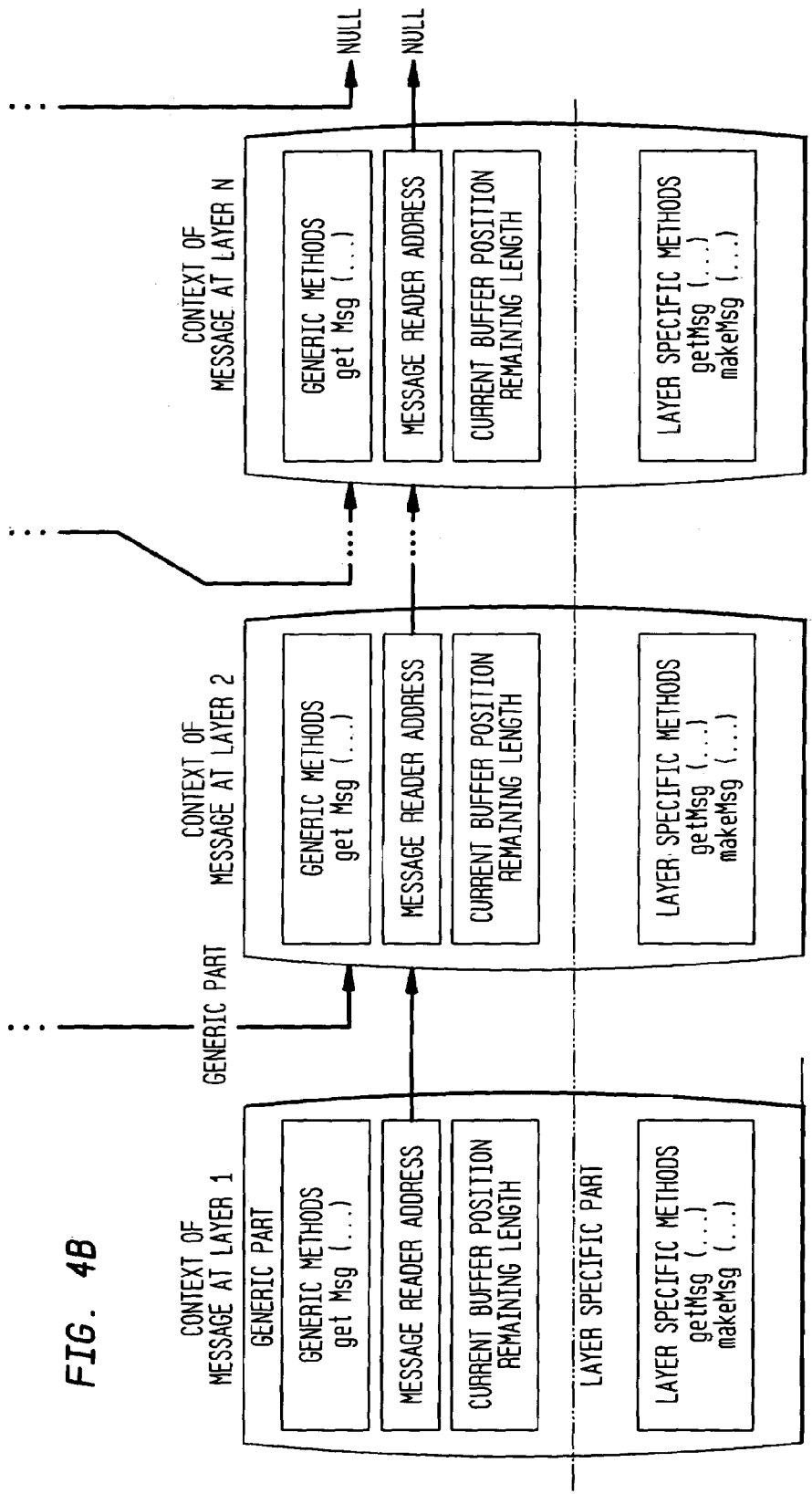

FIG. 4 illustrates the detailed model according to an embodiment of the present invention. The enclosed regions in the upper portion of FIG. 4 are symbolic representations of the contexts of each of the layer 1, 2, . . . N messages. The contexts of the layer 1, 2, . . . N messages include variables and methods particular to the layer 1, 2, . . . N messages, respectively. The enclosed regions in the lower portion of FIG. 4 are symbolic representations of the contexts of each of the message readers at the layers 1, 2, . . . N. For encoding, only the context of the layer 1, 2, . . . , N messages are used (the upper half of FIG. 4.) For decoding, the context of the layer 1, 2, . . . , N message readers are used (the lower half of FIG. 4.) until the context of the layer 1, 2, . . . , N messages are recreated.

The order of processing of the layers is from the outermost (lowest) layer 1 to the innermost (highest) layer N. The innermost layer N contains an end-of-layer indicator, wherein the pointer m points to null.

The use of contexts allows the same variable names and methods to be used among the layer 1, 2, . . . , N messages or message readers, the variables and methods being distinguishable by their contexts. The context is split into two parts, (1) the generic part which contains layer independent variables and methods accessible by any entity that has the definition of the generic part known to it, (2) the layer specific part which contains the variables and methods unique to a particular layer. The instantiation of a context for a particular layer creates storage for both the generic part and the layer specific part as well as initializing of variables in both parts. The methods in the generic part are "virtual". Virtual means that invoking a method by the generic name will invoke the method by the same name in the layer specific part.

The generic part of the context for a layer message contains the methods, encode and decode, which invokes the virtual methods encodeHeader, encodeTrailer, decodeHeader, decodeTrailer. These virtual methods automatically invoke the layer specific methods of the same name. The generic part of the context layer message contains variables for message body address, message reader address, initial and current buffer position, coded length and header/body length. The discussion of FIGS. 6 and 7 will cover the use of these. The layer specific part contains the methods encodeHeader, encodeTrailer, decodeHeader, decodeTrailer and the variables for header and trailer field values. These layer specific methods will encode the values into a formatted stream buffer and decode the values from the formatted stream buffer.

The generic part of the context for the message reader contains the virtual method for getMessage and the variable's message reader address and current buffer position. The layer specific part for the message reader contains the method getMessage. The generic virtual method getMessage automatically invokes the layer specific getMessage. The method getMessage will peek in the buffer at the current position, determine the appropriate message to use within that layer and make available an instance of that layer message. This method will set the layer message's message reader address to the value of its own message reader address. This method returns the address of the layer message's context. The linking of layer 1, 2, . . . , N messages or layer 1, 2, . . . N message readers together allow for encode and decode operations to transparently pass from layer context to layer context. "Transparently" describes a state where an application only needs to specify a certain layer and nesting relationship in order to invoke an operation at the outermost (lowest) layer.

Referring to FIGS. 5a and 5b, the encoding and decoding sequence of layer 1, 2, . . . N messages will now be discussed.

FIG. 5a illustrates encoding sequence of layer 1, 2, . . . N messages. The encoding process can start when all layer messages are linked as illustrated in FIG. 3. The encoding process then begins at the "Sender" location, which may be any point in the communication network, (e.g. a "node") capable of generating a message. The sender which holds the layer 1 message invokes the method encode with a buffer of sufficient length to encode all the layer messages. The encode method for each layer's context is, in turn, invoked. This method performs loop L10 as described in FIG. 6. When the layer N message is reached the accumulated sum of the encoded lengths are passed by layer r message to layer r−1 message, where r is a integer value between 1 and N. The method performs, in turn for each layer, loop L12 as described with FIG. 6. When layer 1 message is reached, a fully formatted buffer is available to be sent.

FIG. 5b illustrates decoding sequence of layer 1, 2, . . . N messages. The decoding process can start when all layer message readers are linked as described with FIG. 4. The decoding process then begins at the "Receiver" location, which may be any point in the communication network, (e.g. a "node") capable of receiving a message. The receiver holds the layer 1 message reader and invokes the method getMessage with a received formatted buffer as produced by the encoding process. The getMessage returns an available layer message as described with FIG. 4. The method decode is invoked. These steps are performed for each message layer. The method decode performs loop L41 as described with FIG. 7. When the layer N message is reached the accumulated sum of the decoded lengths are passed by layer r message to layer r−1 message, where r is an integer value between 1 and r. The method performs, in turn for each layer, loop L42 as described with FIG. 7. When layer 1 message is reached, the formatted message buffer has been decomposed into the individual message layer contexts as described with FIG. 3.

Figure 6:
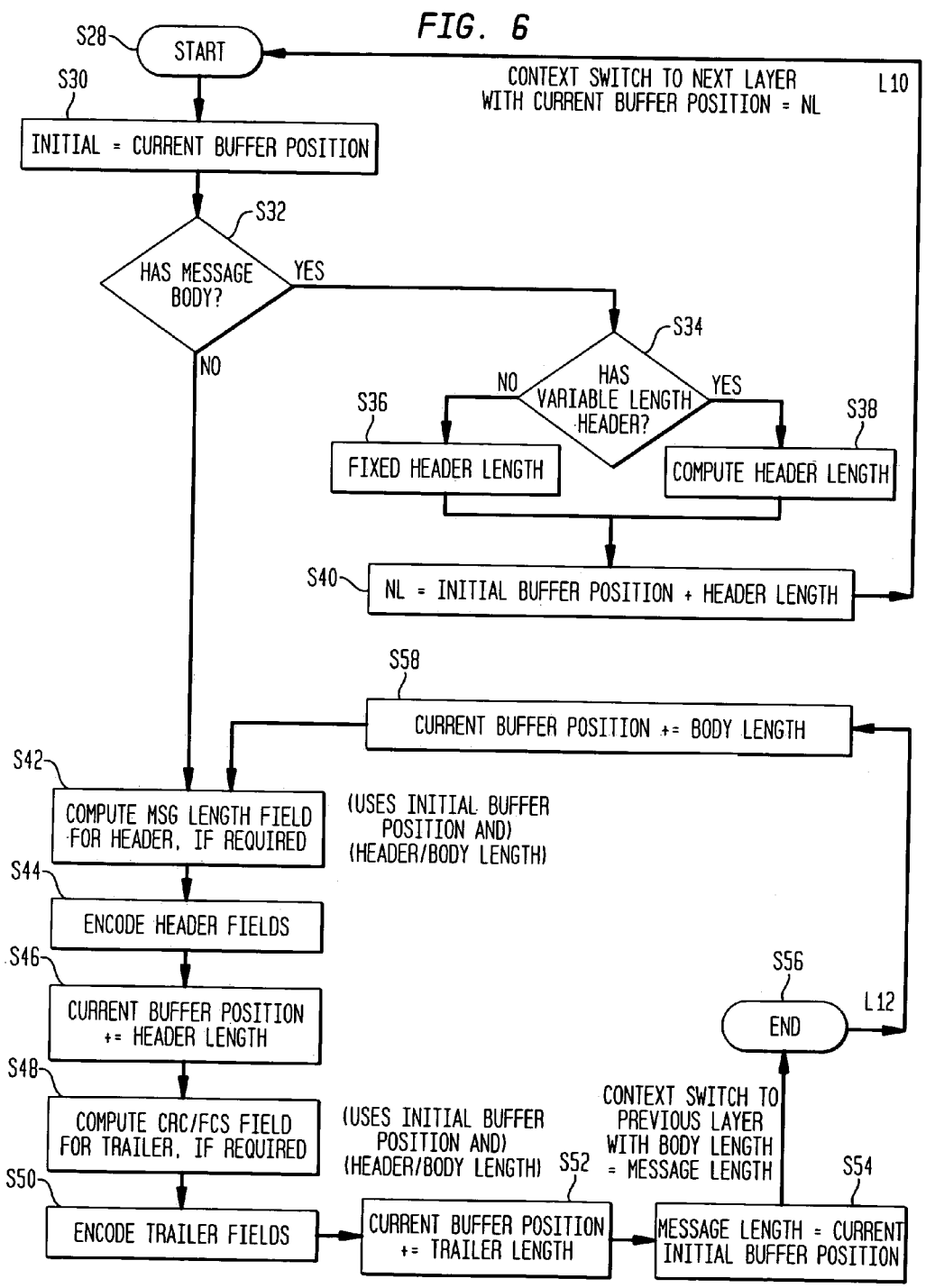
FIG. 6 illustrates encoding method of message layers according to an embodiment of the present invention.

According to an embodiment of the present invention, encoding of the layer 1, 2, . . . N messages will be discussed in further detail by referring to FIG. 6. FIG. 6 is a flow chart illustrating encoding of the layers comprising a protocol stack of a message. "Encoding" of a layer means moving message field values of the layer to the octets or bits message stream undergoing formatting (formatted message stream). The encoding process illustrated in FIG. 6 is performed in first and second loops L10, L12. In general, the first loop L10 advances the buffer position by the header length for each layer, while the second loop L12 encodes the header field values and the trailer field values for each layer. The first loop L10 is iterated for each layer in the protocol stack until the buffer position has been advanced by all of the respective layer header lengths. The iterations of the first loop L10 are followed by the iteration for each layer in the protocol stack in second loop 12.

The layer that includes the user data or information (layer N) is the first layer to be encoded. The user data layer is represented by a layer that contains a "header", but part or all of this header in this case is actually the user data itself. Processing the user information layer N in this manner facilitates uniform processing of all of the layers constituting the message.

The operation of the first loop L10 will now be discussed:

The encoding process begins at step S28 with an allocated message buffer in the message stream of sufficient length to encode all of the layers (forming the protocol stack) in the message to be inserted in the message stream for transmission. In step S30, the initial buffer position is set to the value of the current input buffer position in the message stream. In step S32, it is determined whether or not there is a message body contained within a message to be encoded. If there is a message body in the message to be encoded, then processing remains in loop L10 until all the layers in the message (or protocol stack) have been traversed.

Assuming there is a message body, step S34 determines whether the layer processed in first loop L10 (the "current" layer) has a variable length header. If the current layer has a fixed, or predefined, header length, then in step S36, the predefined header length value is assigned to the current layer. If the layer has a variable length header, in step S38, the header length is determined from the sum of the total length of all the header fields of the layer. In step S40, the current buffer position is incremented by the header length of the layer and is applied as input to step S28. This starts the first loop L10 with the next layer's context. The buffer position from step S40 is forwarded to step S30 as the current buffer position for the next iteration of the first loop L10, and the first loop L10 is performed on the next (higher) layer.

Effectively, in the first loop L10, the buffer position is advanced by the amount of the header length of each layer and the initial and current buffer position and header length are saved within a separate context for each layer. The first loop L10 is executed once for each layer of the message or protocol stack. In step 32, when an end-of-layer indicator is encountered, it is determined that there are no further nested message bodies.

The process now enters the second loop L12 from the "No" output of step S32. In loop L12, the header field values and trailer field values of each layer are encoded, each layer being encoded using its own, separate context. The header field values and the trailer field values are encoded for each layer, and encoding may begin with the user layer (layer N), and terminate at the physical layer (layer 1). The second loop L12 is iterated for each layer until all layers in the message are processed.

The operation of the second loop L12 will now be discussed:

From the "No" output in step S32, the processing continues with step S42, using the same context as started in step S28. The message length field in the header is computed, if required, from the initial buffer position and the header/body length. For the user data layer, layer n, the body length is zero (0). The header field values of the layer being processed (the "current" layer) in the second loop L12 are encoded in step S44. During encoding, the current layer's header field values are moved to the message stream to be formatted. In step S46, the current buffer position is incremented by the sum of the length of the header field values in the current layer or the total header length of the current layer.

In step S48, the CRC/FCS field for the trailer is computed, if required, using the initial buffer position and the header/body length to provide the starting point and range over which to apply the computation. The trailer field values for the current layer are encoded in step S50. During encoding, the trailer field values are moved into the formatted message stream. In step S52, the current buffer position is incremented by the sum of the length of the layer's trailer field values (the total trailer length).

In step S54, the layer's length is calculated by subtracting the initial buffer position saved in step S30 from the current buffer position determined in step S52 and stored in the layer context.

If there are additional layers to process in the second loop L12, the context is switched to the next lower layer and the encoded message length of the current layer is passed as the body length to the next lower layer. In step S58, the current buffer position as available in step S28 is incremented by the message length. The current buffer position is applied to the beginning of the second loop L12. The second loop L12 is executed once for each of the layers in the protocol stack of the message being encoded. After the layer 1 of the message has been processed in the second loop L12, step S56 ends the encoding process. The resultant output of the encoding process illustrated in FIG. 6 is a formatted buffer.

Decoding of the layers 1, 2, . . . , N of a message will be discussed in greater detail with reference to FIG. 7. FIG. 7 is a flow chart illustrating decoding of the layers 1, 2, . . . , N of a protocol stack of a message. Decoding a message involves moving octets or bits of a message (one layer at a time) from a formatted message stream to message fields in each layer's context. The header field values are decoded in a header decoding loop L41, and the trailer field values are decoded in a trailer decoding loop L42.

The decoding process begins at step S64, with a completely formatted message stream buffer, such as one generated in the manner described above, as the input. In step S66, the initial buffer position is set to the value of the current buffer position. In step S68, the header field values are decoded, at which time the octets or bits of the header are moved to the header fields which are stored each the layers context. In step S70, the buffer position is incremented by the sum of the decoded header field value lengths or the total header length.

Each layer (r) of the message includes message reader for layer (r+1) to assist in the decode operation. The message reader is described with FIG. 4. In step S72, it is determined whether or not there is a message reader. If there is, the context is switched to the message reader applying the current buffer position. This message reader represents the next higher message layer. The message reader "peeks" in the message buffer starting at the current buffer position, and determines which type of message is contained for the next higher (r+1) layer. It makes available a layer message context of the correct type. It assigns the layer message's message reader address to its message reader value for the layer after next layer (r+2) to decode. When layer N message is reached, the message reader value is the end-of-layer indicator (e.g. a NULL).

The setting of the message context for layer r+1 is done after step S74*c*. With this new layer context, the current buffer position is applied as input to the header decoding loop L41 at step S64. The header decoding loop L41 is executed once for each layer in the protocol stack of the message being decoded. After each layer has been processed in the header decoding loop 41, i.e. there are no more message readers, step S72 generates a "No" output. The trailer decoding loop L42 then begins decoding of the trailer field values of each of the layers 1, 2 . . . , N, each layer being decoded within its own context.

In step S76, the state values saved include the current layer's initial buffer position, and its combined header and message body length. In step S78, the trailer field values of the current layer are decoded (i.e., the octets or bits of the formatted trailer are moved to the trailer field value in the layer's context. In step S80, the current buffer position is incremented by the sum of the trailer field value lengths or the total trailer length of the current layer.

In step S82, the current layer's length is calculated by subtracting the initial buffer position saved in step S66 from the current buffer position determined in step S80. In step S86, the current buffer position is incremented by this layer length. The new buffer position is applied to the beginning of the trailer decoding loop L42, but within the context of the previous layer. The trailer decoding loop L42 is iterated once for each of the layers in the protocol stack. The resultant output of the decoding process is a fully decoded message. After the final layer N has been decoded, decoding is ended at step S84. The received formatted message buffer is decomposed in the layer messages as described with FIGS. 3 and 4*a*.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for processing a layered message for transmission over a communication network having a layered architecture to form a formatted layered message having encoded data, comprising:

combining unformatted elements by linking a plurality of layer messages based on addresses of contexts for the communication network layers, each context associated with one of the plurality of communication network layers and providing variables and methods for the associated communications network layer, the methods including at least one of encoding and decoding methods; and processing the unformatted elements to form the formatted layered message after the combining step.

2. A method of processing a message in a communication network having a layered architecture, the method comprising:

linking a plurality of layer messages by including an address of a context for a communication network layer in a layer message of a subsequent communication network layer, the context associated with the communication network layer and providing variables and methods for the associated communication network layer, the methods including at least one of encoding and decoding methods; and encoding each layer message after the step of linking is complete.

3. The method according to claim 2, wherein the variables comprise initial and current buffer positions used during encoding and decoding of the layer message for the associated communication network layer.

4. The method according to claim 2, wherein the methods comprise at least methods for encoding and decoding.

5. The method according to claim 4, wherein the method for encoding comprises a method for computing message body dependent fields to include message length and CRC fields.

6. The method according to claim 2, wherein the step of encoding comprises the steps of:
   incrementing a current buffer position by a header length for the layer message of the communication network layer;
   setting the initial buffer position value in the context for a subsequent network communication layer equal to the buffer position obtained from the incrementing step; and
   repeating the incrementing and setting steps for each subsequent communication network layer.

7. The method according to claim 6, further comprising the step of:
   terminating buffer incrementing upon detection of an end-of-layer message indicator.

8. The method according to claim 6, further comprising the steps of:
   moving header field data of each layer message into a message stream; and
   moving trailer field data of each layer message into the message stream, wherein the movement of the header field data and trailer field data results in a formatted message stream having disposed therein encoded data obtained from the linked plurality of layer messages.

9. The method according to claim 8, wherein the trailer field data associated with each layer message comprises CRC/FCS data.

10. The method according to claim 2, wherein the step of linking entails linking layer messages comprising unformatted layer values.

11. The method according to claim 2, wherein the encoding step encodes each layer message of the linked plurality of layer messages into a single buffer.

12. The method according to claim 2, wherein the linking step comprises:
    passing an address of a context for the communication network layer to the subsequent communication network layer, which is adjacent to the communication network layer; and
    setting a message body address of the layer message for the subsequent communication network layer to the passed address.

13. The method according to claim 6, wherein the incrementing step comprises:
    summing, when a header length for a communication network layer is variable, header lengths for each previous communication network layer; and
    incrementing the current buffer position by the sum.

14. The method of claim 2, wherein the layered architecture includes a plurality of communication network layers, and wherein an address for a context layer for each communication network layer is included in each layer message of a subsequent communication network layer, each subsequent transmission layer being subsequent to a one of the plurality of communication network layers.

* * * * *